United States Patent [19]

Gandon et al.

[11] 3,998,628

[45] Dec. 21, 1976

[54] METHOD FOR SELECTIVELY DISSOLVING NON-FERROUS METALS CONTAINED IN PYRITIC ORES

[75] Inventors: Louis Gandon, Rambouillet;
Jean-Michel Demarthe, Viroflay;
Alain Alexandre Sonntag, Maurepas, all of France

[73] Assignee: Societe Miniere et Metallurgique de Penarroya, Paris, France

[22] Filed: Feb. 26, 1975

[21] Appl. No.: 553,323

[30] Foreign Application Priority Data

Feb. 28, 1974 France .............................. 74.06765

[52] U.S. Cl. .............................. 75/104; 75/101 R;
75/112; 75/114; 75/117; 75/118 R; 75/120;
423/40; 423/98; 423/109
[51] Int. Cl.² ................ C22B 15/08; C22B 19/22;
C22B 13/04; C22B 11/06
[58] Field of Search ........ 75/104, 112, 114, 101 R,
75/117, 118 R, 120; 423/40, 98, 109

[56] References Cited

UNITED STATES PATENTS

| 843,986 | 2/1907 | Baker et al. ........................ 75/112 |
| 2,017,330 | 2/1929 | Traphagen ...................... 75/114 X |
| 3,876,748 | 4/1975 | Roorda et al. .................. 75/112 X |
| 3,880,651 | 4/1975 | Queneau et al. ................ 75/117 X |

*Primary Examiner*—G. Ozaki
*Attorney, Agent, or Firm*—Fleit & Jacobson

[57] ABSTRACT

A method for selectively dissolving non-ferrous metals contained in pyritic ores by the steps of crushing the ores, introducing the crushed ore at a temperature above the ambient temperature into a reaction vessel containing a solution of chlorides of a metal having two valance states, and injecting gaseous chlorine into the reaction vessel at a rate such that the oxido-reduction potential of the solution of chlorides remains between 400 and 700 mv during the operation.

4 Claims, No Drawings

METHOD FOR SELECTIVELY DISSOLVING NON-FERROUS METALS CONTAINED IN PYRITIC ORES

The present invention concerns a method of selective dissolution of the non-ferrous metals such as copper, lead and zinc contained in pyritic ores. In the present specification, the expression "selective dissolution" means that sulphur and iron are not dissolved, and that they enter the solution in only small amounts.

The method according to the invention is applicable especially but not exclusively to ores of solid pyrites which contain non-ferrous metals in the form of sulphides or of very finely crystallized sulpho-antimonides and sulpho-arsenides.

Such ores are characterised by fine crystals, which may be of the order of few microns in size, and by the distribution of copper, lead and zinc ores in the pyrites, the matrix generally being of small volume. This fine crystallization is related to the geological conditions in which these ores occur, and these ores may be regarded as being included in the slightly metamorphic or non-metamorphic volcano-sedimentary series. This is particularly the case as regards the considerable deposits of pyritic ores in the south of the Iberian Peninsula, as indeed will be illustrated in the examples (hereinafter) of chemical compositions of actual samples.

The method according to the invention can also be successfully applied in the treatment of other ores, for example cupriferous pyrites containing only a certain proportion of copper sulphide, or more complex pyritic ores containing in addition lead sulphide and zinc sulphide, which may or may not be associated with copper sulphides, or sulphurized concentrates obtained by flotation, such as blende, galenite or chalcopyrite.

Numerous methods are known for treating sulphurized ores for the purpose of extracting therefrom the non-ferrous metals that they contain. These conventional methods will not be described in detail herein, except to mention that generally such sulphurized ores are first subjected to flotation which enables sulphurized concentrates to be obtained which mainly contain copper sulphides, blende and/or galenite, these concentrates then being used as the starting materials in the conventional metallurgical processes for extracting copper, zinc and lead. However, the preliminary flotation stage can sometimes be difficult to carry out and it complicates the entire metallurgical treatment.

It is for this reason that, for example, the recovery by flotation of non-ferrous metals contained in certain pyritic ores cannot be carried out to give the theoretical yields. Also, this recovery sometimes involves special treatments because of the fine crystallization, particularly in the case of the ores referred to above from the south of the Iberian Peninsula.

Since, therefore, the structure and composition of this ore do not permit flotation to be carried out by a reliable and simple technique, it has been necessary to resort to roasting with simultaneous production of sulphuric acid, before proceeding with the extraction of the non-ferrous and precious metals contained in the ore. Such roasting produces environmentally undesirable sulphur dioxide.

An object of the present invention is to provide a method of selective dissolution of the non-ferrous metals contained in pyritic ores, whereby the pyrites remains practically undissolved and the sulphur associated with the non-ferrous metals remains mostly in elemental form, to avoid a roasting step.

A further object is to obtain good dissolution yields of the non-ferrous (especially the precious) metals, such as copper, zinc, lead and silver, contained in pyritic ores.

An additional object is to avoid a preliminary ore-treatment step in the form of flotation and/or roasting.

The invention consists in a method of selective dissolution of the non-ferrous metals contained in pyritic ore, comprising crushing the ore, introducing the crushed ore at a temperature above room temperature into a reaction vessel containing a solution of a chloride of a metal capable of having two valency states, and injecting gaseous chlorine into the reaction vessel.

The contents of the reaction vessel are advantageously stirred continuously and especially while the crushed ore is being introduced.

Preferably, the rate of injection of the gaseous chlorine is controlled such that the oxido-reduction potential of the solution of the metal chloride remains substantially constant. Clearly, the chlorine supply could be continuously automatically adjusted by a servo-unit and a unit monitoring the potential.

In a first embodiment of the invention, the metal capable of having two valency states is iron, so that the lixiviation solution of the ore contains a mixture of ferrous and ferric chlorides. In this case the oxido-reduction potential should be from 300 millivolts to 2 volts, preferably between 300 and 700 millivolts, the pH value of the solution being from −1 (equivalent to a 10N solution of a strong acid) to +2.

The choice of the oxido-reduction potential to be used will, of course, depend to a large extent upon the nature of the ore to be treated and upon the result required. Thus, it may be required to dissolve the maximum quantity of non-ferrous metal such as copper, zinc and lead, even if a relatively large quantity of iron and sulphur is thereby brought into solution, while elsewhere it may be required to limit the quantity of iron and sulphur that is dissolved to the lowest possible value, even at the cost of a smaller yield of dissolved non-ferrous metals.

In an aqueous solution containing copper, iron and sulphur, the iron in fact is present in the ferrous state in two different potential ranges: between −500 and +200 millivolts, and above 300 millivolts, these potentials being calculated relative to the potential of the hydrogen electrode, which is regarded as 0 millivolt, so that the figures indicated have an absolute value. Since the present embodiment requires the simultaneous existence in the solution of $Fe^{++}$ ions and $Fe^{+++}$ ions, it will be clear that the potential should be selected from one of the two ranges indicated above. However, since for obvious reasons it is advisable to use the copper ionization range and since that range corresponds to a potential greater than +300 millivolts, that range should be employed. Practical considerations require that the upper limit of the range be +2 volts. Thus, in this embodiment, the oxido-reduction potential of the solution may be selected from within the range of 300 millivolts to 2 volts if the object is to bring the maximum quantity of copper, lead and zinc into solution.

However, high potentials appear to result in the dissolution of considerable quantities of sulphur.

If this is undesirable, the reaction potential should be limited to +650 or +700 millivolts.

A few simple preliminary experiments, the basic form of which will be explained hereinafter, will enable practitioners to ascertain a suitable reaction potential to be used for their particular purposes.

In a second embodiment of the present invention, the metal capable of having two valency states is copper, so that the lixiviation solution of the ore contains a mixture of cuprous and cupric chlorides. In this case the oxido-reduction potential shoudl be from +400 millivolts to +2 volts, the pH value of the solution being from −1 to +5.

The considerations stated above relating to the choice of oxido-reduction potential will of course apply here too, and lead to a preference for a reaction potential of between 400 and 700 millivolts, more preferably 450 to 650 millivolts.

The temperature of the lixivation solution must be maintained above room temperature. Experiments indicate that reaction can successfully proceed, with certain types of ores, at temperatures as low as approximately 70° C, but higher temperatures, for example from 90° to 105° C, are preferred.

The iron or copper concentration in the lixiviation solution can be readily determined by simple experiments and with the aid of the explanations given hereunder.

In the case of a solution containing a mixture of ferrous and ferric chlorides, that is to say in the first embodiment of the invention, a useful range of concentrations is from 5 grams of iron (ferrous plus ferric) per litre up to saturation at the current temperature. Economic considerations lead, however, to a preferred iron content in the solution of 10 to 25 grams per litre. This range also offers the advantage that the weight ratio of the iron to the total metals contained in the ore remains low during the reaction because of a continuous re-oxidation by the gaseous chlorine of the ferrous iron to form ferric iron at a rate commensurate with the reduction of the ferric ions by the treated ore.

In the second embodiment of the invention, where the reaction solution contains a mixture of cuprous and cupric ions, an initial concentration of 5 grams of copper per liter is necessary to achieve good kinetics when the ore is reacted with chlorine and the oxido-reducing couple $Cu^+/Cu^{++}$. Again, a saturated copper solution would be technically acceptable, but for economic reasons a preferred initial concentration is of 25 to 30 grams per litre. In this case too, the invention can offer the advantage that the weight ratio of copper to the total metals contained in the ore is low, this being possible because of the fact that cuprous is reoxidized by the chlorine as soon as formed, whereby continuously to provide the cupric ions for oxidising the ore.

In the industrial application of the method according to the invention, the oxido-reducing couple present in the reaction solution, for example $Fe^{++}/Fe^{+++}$ or $Cu^+/Cu^{++}$, may be provided by the ore itself by partial recycling of the solution after lixiviation.

For better dissolution yields, the residue of the pyritic ore may be subjected to a further selective dissolution by the method set forth above.

The invention can provide other advantages, as follows:

Metals such as zinc, lead and silver can be brought into solution under appropriate conditions with yields in excess of 95%. With copper, the yield under appropriate conditions can be better than 80% even when the ore to be treated is chalcopyrite, which is reputedly quite difficult to dissolve. On the other hand dissolution is very selective as regards the sulphur and iron in the pyrites. Thus, the sulphur from the reacted sulphides is oxidized to the elementary condition and thus remains with the pyrites; this procedure thus provides a solid effluent, which is environmentally advantageous and avoids the need to produce sulphuric acid as the usual means of removing sulphur without releasing sulphur dioxide into the atmosphere.

The only reagent having to be added to the actual materials to be treated is chlorine, since the metal used for controlling the oxydo-reduction potential, e.g. iron or copper, may already be present in the ore. At all events, even if some other metal is chosen, only a small quantity is required.

It is not necessary to liberate the ore completely, i.e. to crush the initial material to as fine a particle size as is needed for flotation.

Arsenic present in the ore and often very harmful in hydrometallurgical processes can be brought into solution if required. In this way this harmful element is eliminated from the residual ore. The arseniferous solution can be readily freed of arsenic by known means.

Indeed, the solutions obtained by the method of the invention and containing the various metals of interest lend themselves to further treatment by known processes to recover the metals; these known processes may in particular include concentration and/or precipitation operations.

The solutions could suitably be subjected to more modern techniques such as solvent extraction, ion-exchange separation or selective or non-selective electrolysis.

The invention of course extends to the metals recovered from these solutions.

The following Examples, to which the invention is in no way limited, will illustrate embodiments of the present invention:

EXAMPLE 1

A pyritic ore had the following composition by weight:

| | | |
|---|---|---|
| Fe | : | 41.85% |
| S | : | 48.93% |
| Cu | : | 1.53% |
| Zn | : | 2.81% |
| Pb | : | 1.30% |

760 g of this ore were first crushed to a particle-size of less than 100 microns, that is to say sufficiently finely to bring the chalcopyrite, blende and galenite crystals, embedded in the pyrites, into contact with the chemical dissolution reagent, without however effecting complete liberation of these crystals.

The crushed pyrites were introduced into a reaction vessel having a capacity of approximately 2 litres and fitted with an "anchor"-type stirring means, a chlorine-injection port disposed near the blades of the stirring means, and a platinum-calomel electrode for measuring the potential.

This reaction vessel also contained 2 litres of a ferric chloride solution at about 98° C containing 12 grams of $Fe^{+++}$ per litre.

Gaseous chlorine was then injected into the reaction vessel, the rate of delivery of this gas being adjusted in such a way that the oxido-reduction potential of the solution remained stable at 560 millivolts during a period of 6 hours 30 minutes. In fact, the rate of chlorine delivery had to be steadily decreased as the non-ferrous metals went into solution.

When the reaction was completed, the stirred contents of the reaction vessel were filtered to give a solid residue of pyrites and sulphur, and a solution containing the chlorides of the various metals brought into solution during the reaction.

Analysis of this solution showed that the following dissolution yields had been attained as a percentage of the starting materials:

| | | |
|---|---|---|
| Cu | : | 55.5% |
| Zn | : | 84.6% |
| Fe | : | 3.2% |
| (of which iron from the pyrites (iron pyrites) accounted for 1.2%) | | |
| Pb | : | 92.1% |
| S | : | 0.9% (in the form of $SO_4^{--}$) |

During the experiment it was observed that the dissolution of the copper was rather slow. However, the yields of dissolved zinc and lead were good and the selectivity as regards iron was also good.

EXAMPLE 2

410 g of the same ore as in Example 1 were used and subjected to a substantially identical treatment. However, the lixiviation solution was this time a cupric chloride solution containing 28.5 grams of copper per litre. Furthermore, the experiment lasted only four hours. As in Example 1, the potential was kept at the desired value by varying the chlorine supply; in this Example the potential was 640 millivolts during the first 3 hours and then 700 millivolts during the last hour of the experiment.

Analysis as in Example 1 showed that the following dissolution yields had been attained:

| | | |
|---|---|---|
| Cu | : | 66.0% |
| Zn | : | 94.0% |
| Fe | : | 5.4% |
| (of which iron from the pyrites accounted for 2.85%) | | |
| Pb | : | 91.0% |
| S | : | 2.4% (in the form of $SO_4^{--}$) |
| Ag | : | 95.0% |

It was observed that the dissolution of the copper was much more rapid than in Example 1.

EXAMPLE 3

1,000 grams of an ore from a different source were used. The ore had the following composition by weight:

| | | |
|---|---|---|
| Fe | : | 42.50% |
| S | : | 50.14% |
| Cu | : | 0.96% |
| Zn | : | 2.5% |
| Pb | : | 0.9% |

This ore was crushed to a particle size of less than 100 microns, was then brought into suspension in a cupric chloride solution containing 27.7 grams of copper per litre, and was reacted with chlorine injected at the appropriate rate for maintaining the oxido-reduction potential constant at 650 millivolts. The experiment lasted 5 hours.

Analysis as in Example 1 showed that the following dissolution yields had been attained

| | | |
|---|---|---|
| Cu | : | 82.0% |
| Zn | : | 96.5% |
| Fe | : | 4.4% |
| (of which iron from the pyrites accounted for 2.72%) | | |
| Pb | : | 93.0% |
| S | : | 2.0% (in the form of $SO_4^{--}$) |
| As | : | 37.0% |

It will be seen that the yields of non-ferrous metals in the solution were excellent, while there was good selectivity as regards iron and sulphur.

EXAMPLES 4 to 6

In these Examples an ore crushed to a particle size of 50 microns and having the following weight composition was treated:

| | | |
|---|---|---|
| Cu | : | 0.42% |
| Fe | : | 41.0% |
| Zn | : | 3.75% |
| Pb | : | 1.90% |
| Ag | : | 39 grams per ton |
| Au | : | 0.4 grams per ton |
| As | : | 0.66% |
| S | : | remainder |

The table below shows the main experimental conditions.

| Example No: | 4 | 5 | 6 |
|---|---|---|---|
| Weight of ore treated (g) | 827 | 545 | 500 |
| Type of solution | $CuCl_2$ | $FeCl_3$ | $FeCl_3$ |
| Concentration of the solution (g/l) | 28 | 12 | 12 |
| Reaction time (h) | 6½ | 5½ | n.d. |
| Potential (mV) | 650 | 550 | 750 |
| Quantity of $Cl_2$ supplied (g) | 155 | 115 | n.d. | n.d. = not determined

In each Example, 2.15 l of solution at 97° C were used.

The yields of elements in solution (as a percentage of the total element present in the starting materials) are indicated in the table below:

| Example No: | 4 | 5 | 6 |
|---|---|---|---|
| Copper | 73.6 | 73.9 | 74.8 |
| Lead | 84.0 | 85.7 | 92.8 |
| Zinc | 89.3 | 76.8 | 96.9 |
| Silver | 75.0 | 71.5 | 65.0 |
| Iron | 6.45 | 5.7 | 14.8 |
| —of which iron from the pyrites accounts for | 5.6 | 4.9 | 14.1 |

It will be seen that the use of a higher potential slightly increases certain of the dissolution yields but with a loss of selectivity as regards iron.

EXAMPLE 7

In this experiment, the residue obtained in Example 5 (having a weight of 388 grams) was treated with 2.15 l of a ferric chloride solution containing 10 grams of iron per litre. To hold the potential at 550 mV for a period of 5 hours, 23 grams of chlorine were introduced over that period.

The dissolution yields obtained by this second reaction were as follows, wherein "100%" would signify that all the element not dissolved in Example 5 was indeed recovered in the second reaction.

| | | |
|---|---|---|
| Cu | : | 35.5% |
| Pb | : | 45.5% |
| Zn | : | 44.6% |
| Ag | : | 40.0% |
| Fe | : | 0.2% (of which 0.15% is from the pyrites) |

The cumulative yield of each element from the two reactions, i.e. of Example 5 and of this Example, was as follows:

| | | |
|---|---|---|
| Cu | : | 83.2%  ( = 73.9% from Ex. 5 + (100 − 73.9) × 35.5% from this Ex.) |
| Pb | : | 92.2% |
| Zn | : | 87.1% |
| Ag | : | 82.9% |
| Fe | : | 5.9% (of which 5.0% is from the pyrites) |

We claim:
1. A method for selectively dissolving non-ferrous metals selected from the group consisting of copper, zinc, lead and silver contained in pyritic ores, comprising crushing the ore, introducing the crushed ore, while being stirred and at a temperature above the ambient temperature, into a reaction vessel containing a solution of chlorides of a metal having two valency states selected from the group consisting of copper and iron, the concentration of said metal having two valency states being between 5 and 25 g/l and with the proviso that the ph of said solution is between −1 and 5 when the leachant is copper chloride and between −1 and 2 when the leachant is iron chloride, and injecting gaseous chloride into said reaction vessel at a rate such that the oxido-reduction potential of said solution of chlorides remains between 400 and 700 mv constant during the operation whereby a substantial amount of iron and sulphur found in the ore remains undissolved in the solution.

2. A method according to claim 1, wherein said oxido-reduction potential is 450–650 millivolts.

3. A method according to claim 1, wherein the temperature of said solution of chlorides is between 90° and 105° C.

4. A method according to any one of claim 1, wherein a part of the solution obtained by selective dissolution of the initial ore is recycled for further reaction.

* * * * *